Figures 1, 2:
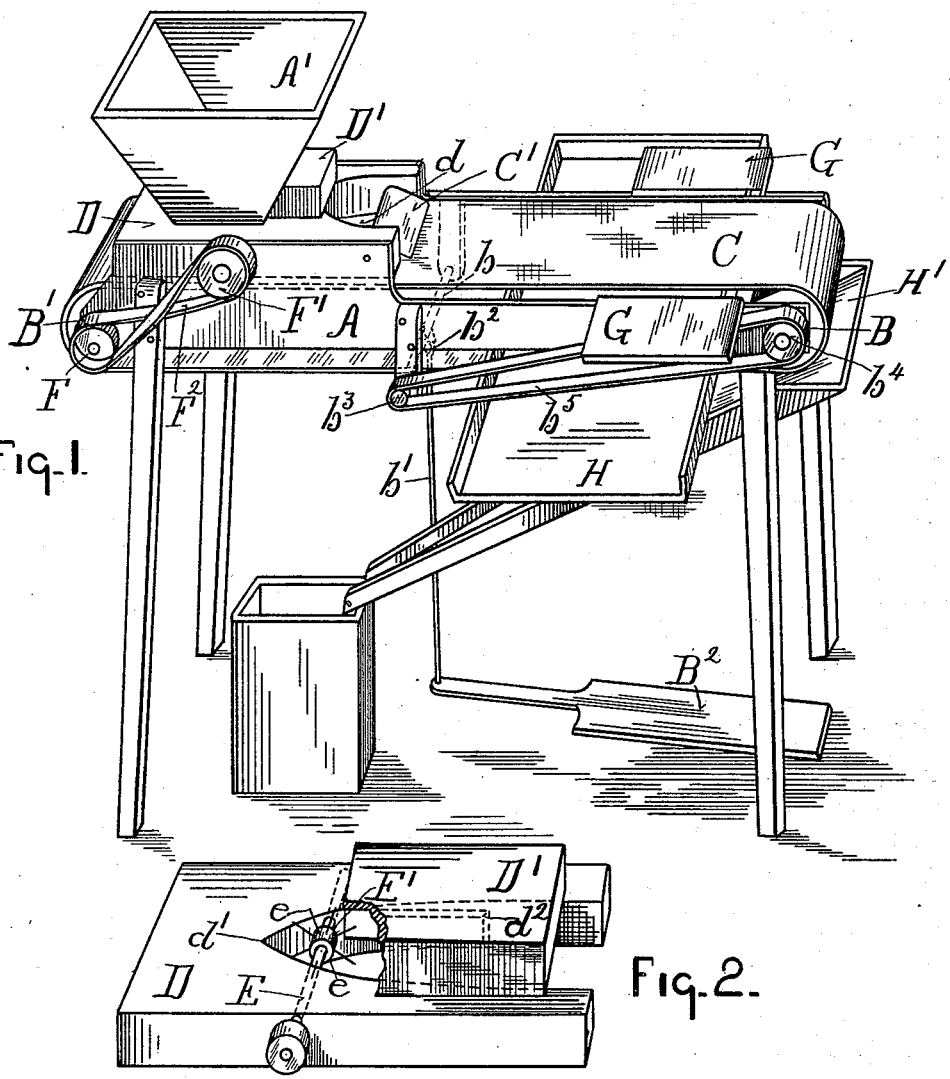

(No Model.)

H. A. BACON.
BEAN PICKER.

No. 483,986. Patented Oct. 11, 1892.

WITNESSES
F. Clough.
Dell J. Brown

INVENTOR
Hiram A. Bacon
by Parker & Burton
Attorneys.

UNITED STATES PATENT OFFICE.

HIRAM A. BACON, OF PONTIAC, MICHIGAN.

BEAN-PICKER.

SPECIFICATION forming part of Letters Patent No. 483,986, dated October 11, 1892.

Application filed November 28, 1891. Serial No. 413,366. (No model.)

*To all whom it may concern:*

Be it known that I, HIRAM A. BACON, a citizen of the United States, residing at Pontiac, county of Oakland, State of Michigan, have invented a certain new and useful Improvement in Bean-Pickers; and I declare the following to be a full, clear, and exact description of the invention, such as will enable others skilled in the art to which it pertains to make and use the same, reference being had to the accompanying drawings, which form a part of this specification.

In the drawings, Figure 1 is a perspective of my machine for picking beans. Fig. 2 is a view showing details of the feeding mechanism.

A is the frame of the machine. A' is the hopper. In the ends of the frame are mounted the rolls B and B', carrying the belt C. The roll B gives motion to the belt and is driven by foot-power. The foot-lever $B^2$ operates the shaft $b$ through the connecting-rod $b'$ and crank $b^2$. The shaft $b$ is geared with the roll B through the pulleys $b^3$ and $b^4$ and the belt $b^5$. Any desired power may be used in place of the foot-power shown without departing from my invention.

To feed the beans regularly from the hopper A' to the belt C, I employ below or at the base of the hopper a block D, which has a portion cut away, so as to form an angular recess $d\ d'$. Across the recess passes a shaft E, carrying a revolving armed feed-wheel E'. Motion is given to the armed feed-wheel E', so that its arms $e$ move downward through the angle $d'$. The feed-opening from the hopper A' is placed immediately over the armed revolving feed-wheel E', and the beans pass from the hopper between the angle $d'$ and the shaft E with a regular and equal feed onto the carrying-belt C. On top of the block D is the sliding block D', projecting through the front wall of the hopper, having a slot $d^2$, in which the arms of the feed E' may revolve. By sliding the block D' toward the angle $d'$ the opening from the hopper through the block D is contracted, while the feed acts to force the beans through the opening that remains. To drive the shaft E, I employ the gearing, consisting of the pulley F on the shaft of the roll B' and the pulley F', driven from F by the belt $F^2$. The beans after being fed to the belt C are spread over its surface by the apron C', suspended over the belt. As the beans move toward the end of the machine on the belt the operator, who sits at the delivery end of the machine, slides the poor beans and foreign matter off the sides of the belt into the chute H and into any receptacle below. The good beans are left on the belt and carried over the roll B into the chute H'. On the sides of the frame are the arm-rests G G, forming a support for the elbows of the operator, while both hands are free to assort the beans on the belt.

The advantages of this machine are manifest. The beans are fed to the operator in a definite amount and are spread over the surface of the belt so as to be easily selected and picked. If the beans are comparatively clean, they may be fed faster by moving the block D. The operator is able to use both hands, and can thus remove twice the number of foreign elements.

What I claim is—

1. In a bean-picker, the combination of a hopper, a block at the base of said hopper, provided with an angular recess, an armed revolving feeder adapted to rotate in said angular recess, a sliding valve above said angular recess, provided with a slot within which the arms of said feeder rotate and adapted to constrict the opening from said hopper to said angular recess, and a traveling belt adapted to receive and carry forward the beans fed to it by said revolving feeder, substantially as and for the purpose specified.

2. In a bean-picker, the combination of the hopper A', the block D, provided with the angular recess $d\ d'$, the armed revolving feeder E', the sliding valve D', provided with the slot $d^2$, through which the arms of the revolving feed E' pass, a traveling belt C, and the suspended apron C', substantially as and for the purpose specified.

In testimony whereof I sign this specification in the presence of two witnesses.

HIRAM A. BACON.

Witnesses:
 EFFIE I. CROFT,
 CHARLES H. FISK.